(12) United States Patent
Anzawa et al.

(10) Patent No.: US 9,297,339 B2
(45) Date of Patent: Mar. 29, 2016

(54) CONTROL DEVICE FOR INTERNAL COMBUSTION ENGINE

(75) Inventors: Takumi Anzawa, Okazaki (JP); Kenya Maruyama, Nissin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 325 days.

(21) Appl. No.: 13/825,180

(22) PCT Filed: Sep. 23, 2010

(86) PCT No.: PCT/JP2010/066458
§ 371 (c)(1),
(2), (4) Date: Mar. 20, 2013

(87) PCT Pub. No.: WO2012/039047
PCT Pub. Date: Mar. 29, 2012

(65) Prior Publication Data
US 2013/0186374 A1     Jul. 25, 2013

(51) Int. Cl.
*F02M 25/08* (2006.01)
*F02D 37/02* (2006.01)
(Continued)

(52) U.S. Cl.
CPC .............. *F02M 25/08* (2013.01); *F02D 37/02* (2013.01); *F02D 41/0042* (2013.01); *F02D 41/0055* (2013.01); *F02D 41/18* (2013.01); *F02P 5/1516* (2013.01); *F02D 2041/001* (2013.01); *F02D 2200/0402* (2013.01);
(Continued)

(58) Field of Classification Search
CPC .......... F02M 25/0718; F02M 25/0713; F02M 25/0738; F02M 35/1038; F02M 25/0754; F02D 41/0072; F02D 41/0065; F02D 41/0077; F02D 41/401; F02D 2200/0802; F02D 41/0045

USPC ................... 123/518, 516, 525, 515, 568.11, 123/568.16, 568.21; 701/103–105, 110
See application file for complete search history.

(56) References Cited

U.S. PATENT DOCUMENTS 5,626,122 A * 5/1997 Azuma ........................ 123/685
5,975,047 A * 11/1999 Kamura et al. ............... 123/305
(Continued)

FOREIGN PATENT DOCUMENTS

| JP | 06317198 A | * 11/1994 |
| JP | 7-034921 A | 2/1995 |

(Continued)

*Primary Examiner* — Lindsay Low
*Assistant Examiner* — Long T Tran
(74) *Attorney, Agent, or Firm* — Sughrue Mion, PLLC (57) ABSTRACT

Disclosed is a control device applied to an internal combustion engine provided with a fuel vapor treatment system for treating collected fuel vapor by purging the collected fuel vapor into intake air downstream from an air flowmeter (6) and an exhaust gas recirculation system for recirculating part of exhaust gas in the intake air using intake negative pressure. An electronic control unit (22) performs an advance correction corresponding to the exhaust gas recirculation quantity regarding the MBT ignition timing and the knock limit ignition timing, and corrects the volumetric efficiency of the internal combustion engine, which is used for the calculation of the advance correction quantity used for the advance correction, according to the purge air quantity. Consequently, regardless of the decrease of the exhaust gas recirculation quantity caused by the implementation of a large quantity of purge, the appropriate advance corrections of the MBT ignition timing and the knock limit ignition timing become possible.

6 Claims, 4 Drawing Sheets

(51) Int. Cl.
*F02D 41/00* (2006.01)
*F02D 41/18* (2006.01)
*F02P 5/15* (2006.01)

(52) U.S. Cl.
CPC ............... *F02D 2200/0411* (2013.01); *F02D 2200/0416* (2013.01); *Y02T 10/46* (2013.01); *Y02T 10/47* (2013.01)

(56) References Cited

U.S. PATENT DOCUMENTS

| | | | |
|---|---|---|---|
| 7,165,517 B2* | 1/2007 | Sugiyama et al. | 123/48 R |
| 7,493,207 B2* | 2/2009 | Yasui et al. | 701/103 |
| 7,783,408 B2* | 8/2010 | Teraya | 701/102 |
| 7,966,989 B2* | 6/2011 | Kurashima et al. | 123/297 |
| 8,000,881 B2* | 8/2011 | Soejima et al. | 701/104 |
| 2002/0017276 A1* | 2/2002 | Machida | 123/406.47 |
| 2006/0125212 A1* | 6/2006 | Kretzschmar et al. | 280/728.2 |
| 2008/0312808 A1 | 12/2008 | Mino et al. | |
| 2009/0125212 A1* | 5/2009 | Kurashima et al. | 701/103 |
| 2009/0266335 A1* | 10/2009 | Kawamura et al. | 123/406.19 |
| 2010/0186726 A1* | 7/2010 | Takagi | 123/568.16 |
| 2010/0305832 A1* | 12/2010 | Asano et al. | 701/103 |
| 2011/0155109 A1* | 6/2011 | Onishi et al. | 123/568.11 |

FOREIGN PATENT DOCUMENTS

| | | |
|---|---|---|
| JP | 10-274143 A | 10/1998 |
| JP | 10-318047 A | 12/1998 |
| JP | 11-044261 A | 2/1999 |
| JP | 11-287143 A | 10/1999 |
| JP | 2002-309993 A | 10/2002 |
| JP | 2004-156626 A | 6/2004 |
| JP | 2008-309093 A | 12/2008 |
| JP | 2010-106770 A | 5/2010 |
| JP | 2010-168931 A | 8/2010 |

* cited by examiner

CONTROL DEVICE FOR INTERNAL COMBUSTION ENGINE

CROSS REFERENCE TO RELATED APPLICATIONS

This application is a National Stage of International Application No. PCT/JP2010/066458 filed Sep. 23, 2010, the contents of all of which are incorporated herein by reference in their entirety.

TECHNICAL FIELD

The present invention relates to a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure.

A fuel vapor processing system that collects fuel vapor generated in a fuel tank with a charcoal canister and purges and processes the collected fuel vapor in the intake air at the downstream side of an air flow meter is known as one system for an in-vehicle internal combustion engine. In an internal combustion engine including such a fuel vapor processing system, when fuel is purged, the fuel vapor in the purge air results in excess fuel being supplied to the cylinder. This leads to an over-rich air-fuel ratio. Thus, as described in the example of patent document 1, a conventional in-vehicle internal combustion engine including a fuel vapor processing system obtains the amount of fuel supplied in excess to the cylinder resulting from the fuel vapor purging to decrease and correct the amount of fuel injected from an injector accordingly and thereby suppress the air-fuel ratio from becoming over-rich. The decreasing correction amount of the fuel in this case is obtained from a learning value of the fuel concentration of the purge air and a flow rate of the purge air.

PRIOR ART DOCUMENT

Patent Document

Patent Document 1: Japanese Laid-Open Patent Publication No. 7-34921

SUMMARY OF THE INVENTION

Problems that the Invention is to Solve

The fuel vapor is purged using intake negative pressure. Thus, the fuel vapor is purged during the operation of a low load during which the intake negative pressure is large. However, a hybrid vehicle that includes two power sources, an internal combustion engine and a motor, attempts to avoid low load operation, which lowers the efficiency of the internal combustion engine. This limits the opportunities for performing fuel vapor purging. Thus, in a hybrid vehicle including the fuel vapor processing system, whenever purging is performed, a large amount is processed so that the fuel vapor can be completely processed in the limited opportunities.

An exhaust gas recirculation system that recirculates some of the exhaust gas to the intake air using intake negative pressure is also known as a system for an in-vehicle internal combustion engine. The conventional exhaust gas recirculation is performed to reduce the emissions of NOx by slowing combustion. However, in recent years, a greater amount of exhaust gas is recirculated to increase the compression ratio of the internal combustion engine and improve the fuel efficiency performance.

In an internal combustion engine that draws in large amounts of recirculated exhaust gas, the following problems arise when purging is performed in large amounts. More specifically, when purging a large amount of fuel vapor when recirculation exhaust is being performed, the drawn amount of the purge air increases the amount of air in the intake passage and decrease the intake negative pressure. This reduces the exhaust gas recirculation amount. Thus, in such an internal combustion engine, when purging is performed in large amounts, the exhaust gas recirculation amount becomes less than expected.

When the exhaust gas is recirculated, combustion is slowed. Thus, in an internal combustion engine including an exhaust gas recirculation system, a control for advancing the ignition timing is executed when exhaust gas recirculation is performed. The advancement of the ignition timing is performed under the assumption that the recirculating exhaust gas is drawn is as expected. Thus, the ignition timing will be over-advanced if the exhaust gas recirculation amount is less than expected.

Furthermore, since knocking easily occurs when the intake air temperature rises, many internal combustion engines correct the ignition timing in accordance with the intake air temperature. When performing purging in large amounts thereby increasing the actual intake air amount or obtaining an unexpected exhaust gas circulation amount, correction of the ignition timing in accordance with the intake air temperature may result in over-correction.

When the internal combustion engine is in a low rotation operation region, the intake negative pressure is significantly increased to suppress vibration and noise. Thus, the purge amount of the fuel vapor is expected to increase, and a large amount of exhaust gas is expected to be recirculated. Thus, the above problems become prominent in the low rotation operation region.

Such problems are not limited to hybrid vehicles and also occur in internal combustion engines that draw in large amounts of recirculating exhaust gas and perform purging in large amounts.

Accordingly, it is an object of the present invention to provide a controller for an internal combustion engine that performs engine control is a preferable manner regardless of decreases in the exhaust gas recirculation amount when purging is performed in large amounts.

Means for Solving the Problems

To achieve the above object, a first invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller includes a correction unit that corrects at least one of a volume efficiency and a cylinder intake air amount of the internal combustion engine in accordance with an amount of purge air drawn into the intake air.

When purging is performed in large amounts, a large amount of purge air flows into the intake passage. Thus, new air exceeding the amount of new air measured with the air flow meter flows into the combustion chamber. As a result, the volume efficiency of the internal combustion engine and the cylinder intake air amount obtained in accordance with the measurement result of the air flow meter differs from the actual situation. This adversely affects the controllability.

In this regards, the controller of the internal combustion engine according to the invention of the present application, at least one of the volume efficiency and the cylinder intake air amount of the internal combustion engine is corrected in accordance with the amount of purge air drawn into the intake air. Thus, engine control is performed taking into consideration the amount of the new air resulting from the purge air, and the engine control can be performed in a preferable manner regardless of the reduction in the exhaust gas recirculation amount when performing purging in large amounts. The cylinder intake air amount is not a measurement value of the intake air amount by the air flow meter. Rather, the cylinder intake amount refers to the amount of air actually drawn into the cylinder (combustion chamber).

At least one of the volume efficiency or the cylinder intake air amount corrected by the correction unit may be used for the calculation of the engine control parameter correlated with the exhaust gas recirculation amount. Specifically, this may be used to calculate the ignition timing, to calculate the intake air temperature correction amount that is used to correct the ignition timing in accordance with the intake air temperature, to calculate the exhaust gas recirculation amount, to calculate the opening of the EGR valve that adjusts the exhaust gas recirculation amount, to calculate the exhaust gas recirculation amount, to calculate the exhaust gas recirculation rate expressed as a ratio of the exhaust gas recirculation amount with respect to the sum of the exhaust gas recirculation amount and the intake amount of new air.

When the correction unit corrects the volume efficiency, the volume efficiency can be corrected by adding a value, which is obtained by dividing the amount of purge air by the piston pushing amount, to a basic value of the volume efficiency obtained assuming that the purge air is not drawn in.

To achieve the above object, a second invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects an engine control parameter correlated with an exhaust gas recirculation amount in accordance with an amount of purge air drawn into the intake air.

When purging is performed in large amounts, a large amount of purge air flows into the intake passage. This reduces the intake negative pressure. Thus, the exhaust gas recirculation amount becomes less than expected. If the expected exhaust gas recirculation amount is not obtained, the value of the engine control parameter, which is calculated under the assumption that the exhaust gas recirculation amount is as expected, differs from the actual situation.

In this regards, in the invention of the present application, the engine control parameter correlated with the exhaust gas recirculation amount is corrected in accordance with the amount of purge air drawn into the intake air. Thus, the engine control parameter correlated with the exhaust gas recirculation amount can be calculated taking into consideration the reduction in the exhaust gas recirculation amount when the purge air flows in. Therefore, according to the second invention of the present application, the engine control can be performed in a preferable manner regardless of the reduction in the exhaust gas recirculation amount when performing purging in large amounts.

To achieve the above object, a third invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects an ignition timing in accordance with an amount of purge air drawn into the intake air.

When the exhaust gas recirculation is performed, the combustion speed decreases and the time from ignition until the generated torque reaches maximum becomes long. Thus, the ignition timing needs to be advanced and corrected in accordance with the exhaust gas recirculation. When purging is performed in large amounts, a large amount of purge air flows into the intake passage. This reduces the intake negative pressure. Thus, the exhaust gas recirculation amount becomes less than expected. If advancement correction of the ignition timing is performed under the assumption that the expected exhaust gas recirculation amount can be obtained, over-correction occurs.

In this regards, the ignition timing is corrected in accordance with the amount of purge air drawn into the intake air in the invention of the present application. Thus, the advancement correction of the ignition timing can be performed taking into consideration the reduction in the exhaust gas recirculation amount when the purge air flows in, and the engine control can be performed in a preferable manner regardless of the reduction in the exhaust gas recirculation amount when performing purging in large amounts.

To achieve the above object, a fourth invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects an intake air temperature correction amount, which is used to correct an ignition timing in accordance with an intake air temperature, in accordance with an amount of purge air drawn into the intake air.

Since knocking easily occurs when the intake air temperature is high, the ignition timing is sometimes corrected in accordance with the intake air temperature to avoid knocking. Such correction of the ignition timing in accordance with the intake air temperature is also performed under the assumption that the exhaust gas recirculation amount predicted from the engine operation state is ensured. Thus, an appropriate correction cannot be performed if the expected exhaust gas recirculation amount is not obtained when purging is performed in large amounts.

In this regards, the intake air temperature correction amount is corrected in accordance with the amount of purge air drawn into the intake air in the invention of the present application. Thus, the ignition timing can be corrected in accordance with the intake air temperature taking into consideration the reduction in the exhaust gas recirculation amount when the purge air flows in, and the engine control may be performed in a preferable manner regardless of the reduction in the exhaust gas recirculation amount when performing purging in large amounts.

To achieve the above object, a fifth invention of the present invention is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects a control target value of an exhaust gas recirculation amount in accordance with an amount of purge air drawn into the intake air.

When purging is performed in large amounts as described above, the expected exhaust gas recirculation amount is not obtained. Thus, a non-achievable value is set as the control target value of the exhaust gas recirculation amount that is set in accordance with the engine operation state.

In this regards, in the invention of the present application, the control target value of the exhaust gas recirculation amount is corrected in accordance with the amount of purge air drawn into the intake air. Thus, the control target value of the exhaust gas recirculation amount may be set taking into consideration the reduction that occurs when the purge air flows in. Therefore, according to the fifth invention of the present application, the engine control may be performed in a preferable manner regardless of the reduction in the exhaust gas recirculation amount when performing purging in large amounts.

To achieve the above object, a sixth invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects a target opening for an EGR valve that adjusts an exhaust gas recirculation amount in accordance with an amount of purge air drawn into the intake air.

When purging is performed in large amounts as described above, the intake negative pressure reduces and the expected exhaust gas recirculation amount is not obtained. Thus, the required exhaust gas recirculation amount cannot be ensured if the target opening of the EGR valve is set based on an intake negative pressure for when purging is not performed in large amounts.

In this regards, the target opening of the EGR valve that adjusts the exhaust gas recirculation amount is corrected in accordance with the amount of purge air drawn into the intake air. The target opening of the EGR valve thus can be set taking into consideration the reduction in the exhaust gas recirculation amount when the purge air flows in, and the engine control can be performed in a preferable manner regardless of the reduction in the exhaust gas recirculation amount when performing purging in large amounts.

To achieve the above object, the seventh invention of the present application is a controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure. The controller corrects an exhaust gas recirculation rate expressed as a ratio of an exhaust gas recirculation amount with respect to a sum of the exhaust gas recirculation amount and a new intake air amount in accordance with an amount of purge air drawn into the intake air.

In the internal combustion engine, the exhaust gas recirculation rate expressed as the ratio of the exhaust gas recirculation amount with respect to the sum of the exhaust gas recirculation amount and the new intake air amount is calculated, and various types of controls are performed in accordance with such value. If the large amount of purging is performed, the intake negative pressure reduces and the expected exhaust gas recirculation amount is not obtained. As a result, the exhaust gas recirculation rate calculated in accordance with the engine operation state may differ from the actual situation.

In this regards, the exhaust gas recirculation rate is corrected in accordance with the amount of purge air drawn into the intake air in the invention of the present application. Thus, the exhaust gas recirculation rate can be calculated taking into consideration the reduction in the exhaust gas recirculation amount when the purge air flows in, and the engine control can be performed in a preferable manner regardless of the reduction in the exhaust gas recirculation amount when performing purging in large amounts.

EMBODIMENTS OF THE INVENTION

One embodiment of a controller according to an internal combustion engine of the present invention will now be described in detail with reference to FIGS. 1 and 2. The controller of the present embodiment is applied to an internal combustion engine that is mounted on a hybrid vehicle including two drive sources, the internal combustion engine and a motor.

Figure 1:
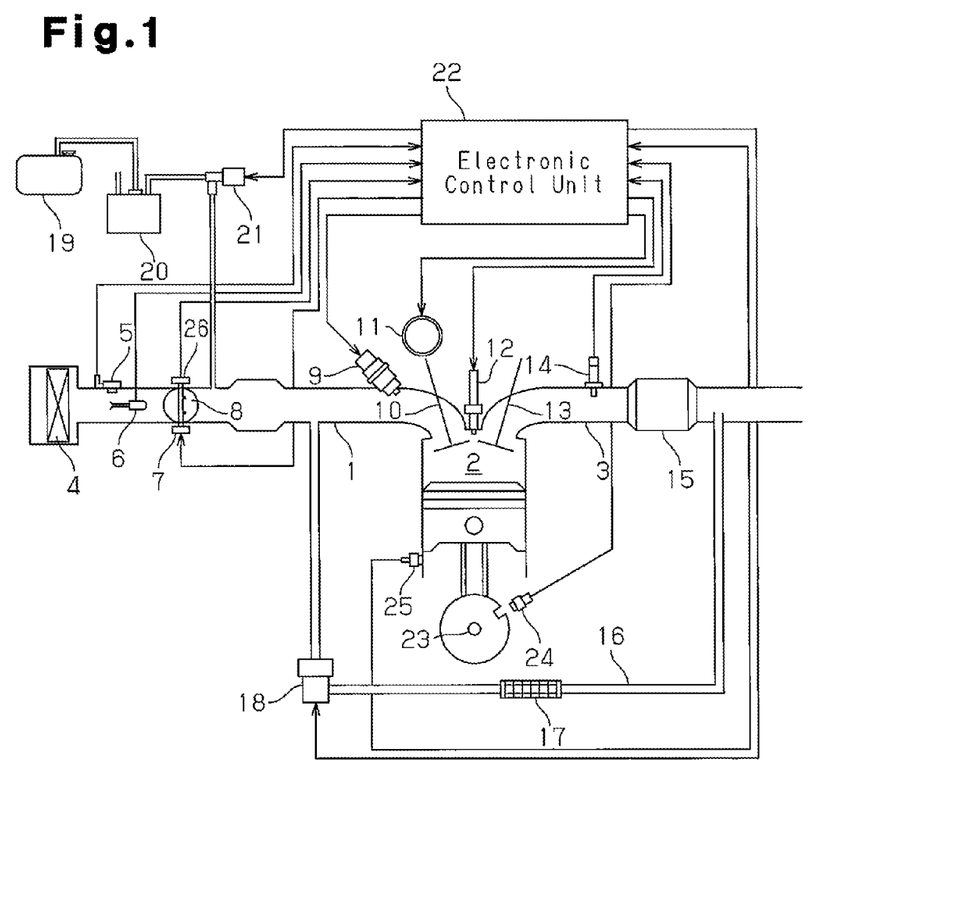
FIG. 1 is a schematic diagram showing the entire configuration of a controller for an internal combustion engine according to a first embodiment of the present invention.

FIG. 1 shows the structure of an internal combustion engine to which the present embodiment is applied. As shown in the drawing, the internal combustion engine includes an intake passage 1, combustion chambers 2, and an exhaust passage 3.

An air cleaner 4 for purifying the intake air, an intake air temperature sensor 5 for detecting the temperature of the intake air, and an air flow meter 6 for detecting the flow rate of the intake air are sequentially arranged from the upstream side of the intake passage 1 of the internal combustion engine. A throttle valve 8, which is driven by a throttle motor 7 to adjust the flow rate of the intake air, and an injector 9, which injects fuel into the intake air, are arranged at the downstream of the air flow meter 6 in the intake passage 1. The intake passage 1 is connected to the combustion chambers 2 by intake valves 10. The intake valves 10 open to connect the intake passage 1 and the combustion chambers 2 and close to disconnect the intake passage 1 and the combustion chambers 2.

A variable valve actuation mechanism 11 is arranged in the internal combustion engine. The variable valve actuation mechanism 11 is configured to vary the opening/closing timing (valve timing) of the intake valve 10 by changing the rotation phase of a camshaft.

Ignition plug 12 that ignite a mixture of the fuel and air drawn into the combustion chambers 2 are arranged in the combustion chambers 2. The combustion chambers 2 are connected to the exhaust passage 3 through exhaust valves 13. The exhaust valves 13 open to connect the combustion chambers 2 and the exhaust passage 3 and close to disconnect the combustion chamber 2 and the exhaust passage 3.

An air-fuel ratio sensor 14 that detects the oxygen concentration in the exhaust gas is arranged in the exhaust passage 3. A catalyst converter 15 that purifies the exhaust gas is arranged at the downstream side of the air-fuel ratio sensor 14 in the exhaust passage 3.

The internal combustion engine includes an exhaust gas recirculation (EGR) system for recirculating some of the exhaust gas to the intake air. The EGR system includes an EGR passage 16 that communicates the downstream side of the catalyst converter 15 of the exhaust passage 3 and the downstream side of the throttle valve 8 in the intake passage 1. The EGR passage 16 includes an EGR cooler 17, which cools the exhaust gas recirculated through the passage, and an EGR valve 18, which adjusts the exhaust gas recirculation amount.

Furthermore, the internal combustion engine also includes a fuel vapor processing system for discharging and the fuel vapor generated in a fuel tank 19 together with air into the intake air at the downstream side of the throttle valve 8 and processing the fuel vapor. The fuel vapor processing system is configured to include a canister 20, which adsorbs and collects the fuel vapor generated in the fuel tank 19, and a purge valve 21, which adjusts the amount of purge air (purge air amount) drawn into the intake air.

The internal combustion engine is controlled by an electronic control unit 22 serving as a control unit. The electronic control unit 22 includes a central processing unit (CPU), which executes various types of calculation processing related to the engine control, and a read-only memory (ROM), which stores programs and data for the engine control. The electronic control unit 22 also includes a random access memory (RAM), which temporarily stores calculation results of the CPU, the detection results of the sensor, and the like, and an input/output port (I/O), which functions as an interface for exchanging signals with an external device.

The detection signals of the intake air temperature sensor 5, the air flow meter 6, and the air-fuel ratio sensor 14 are input to the input port of the electronic control unit 22. Furthermore, the detection signals of a crank position sensor 24 that detects the rotation phase of the crankshaft 23, which is an engine output shaft, a knock sensor 25 that detects the occurrence state of the knocking, a throttle sensor 26 that detects the opening of the throttle valve 8, and the like are also input to the input port of the electronic control unit 22.

The drive circuits of various actuators arranged in portions of the internal combustion engine such as the throttle motor 7, the injector 9, the variable valve actuation mechanism 11, the ignition plug 12, and the like are connected to the output port of the electronic control unit 22. The electronic control unit 22 outputs a command signal to the drive circuits of such actuators to perform the engine control.

In the present embodiment configured as described above, when executing ignition timing control, the electronic control unit 22 performs advancement correction in correspondence with the exhaust gas recirculation amount for an MBT ignition timing T_AMBT and a knock limit ignition timing T_AKNOK. The correction advancement amount for the ignition timing is calculated on the basis of a volume efficiency of the internal combustion engine, an engine rotation speed NE, and an engine coolant temperature THW. The volume efficiency of the internal combustion engine is calculated using an intake system model (also referred to as air model) in which the response of the intake air amount with respect to the throttle movement is modeled and expressed with a mathematical equation. In the air model, however, the influence of the vapor purge on the cylinder intake air amount (amount of air taken into the combustion chamber) is not taken into consideration. Thus, when purging is performed in large amounts, the volume efficiency obtained from the air model may deviate from the actual value. In the present embodiment, the volume efficiency used for the calculation of the correction advancement amount for the ignition timing is corrected in accordance with the purge air amount KLPGRSM.

In the present embodiment, the MBT ignition timing AMBTBVOF and the knock limit ignition timing AKNOKBVOF when the variable valve actuation mechanism 11 is positioned at the most delayed angle, or the VVT most delayed angle, are calculated. A base ignition timing ABSEF at the VVT most delayed angle is calculated from the MBT ignition timing AMBTBVOF and the knock limit ignition timing AKNOKBVOF at the VVT most delayed angle. The calculation of the MBT ignition timing AMBTBVOF and the knock limit ignition timing AKNOKBVOF at the VVT most delayed angle is performed based on the cylinder intake air amount, the engine rotation speed NE, and the like. When the cylinder intake air amount obtained from the air model is used for the calculation of each ignition timing at the VVT most delayed angle, the cylinder intake air amount deviates from the actual value when purging is performed in large amounts, and the value of each ignition timing may become inappropriate. Thus, in the present embodiment, the cylinder intake air amount used for the calculation of the ignition timing at the VVT most delayed angle is also corrected in accordance with the purge air amount KLPGRS.

Figure 2:
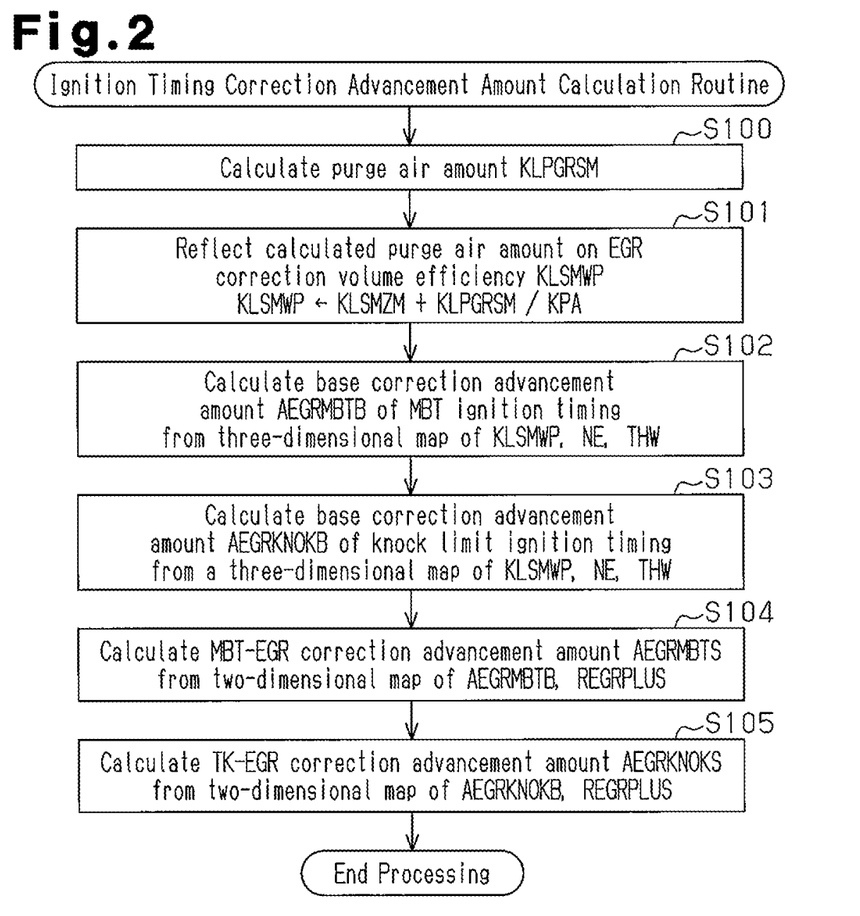
FIG. 2 is a flowchart showing processing procedures of an ignition timing correction advancement amount calculation routine employed in the embodiment.

FIG. 2 shows a flowchart of an ignition timing correction advancement amount calculation routine related to the calculation of the correction advancement amount for the ignition timing described above. The processing of the present routine is repeatedly executed by the electronic control unit 22 for specified control cycles.

When the present routine starts, the electronic control unit 22 first calculates the purge air amount KLPGRSM in step S100. The purge air amount KLPGRSM is obtained by calculating a momentary value of the purge air amount from the engine rotation speed NE and the cylinder intake air amount KL obtained from the air model and then performing a grading process on the calculated momentary value.

In following step S101, the electronic control unit 22 reflects the calculated purge air amount KLPGRSM to the EGR correction volume efficiency KLSMWP. The reflection is performed by adding the value obtained by dividing the purge air amount KLPGRSM with a piston pushing amount KPA to the base value KLSMZM of the volume efficiency obtained under the assumption that there is no drawn in purge air. The base value KLSMZM of the volume efficiency is obtained by dividing the graded value KLSM of the cylinder intake air amount obtained using the air model by the piston pushing amount KPA. The piston pushing amount KPA is the volume of gas pushed out from the cylinder during the exhausting action of the piston and is the exhaust amount for each cylinder.

In step S102, the electronic control unit 22 then calculates the base correction advancement amount AEGRMBTB of the MBT ignition timing from a three-dimensional map including the engine rotation speed NE, the engine coolant temperature THW, and the EGR correction volume efficiency KLSMWP calculated in step S101 as parameters. In following step S103, the electronic control unit 22 calculates the base correction advancement amount AEGRKNOKB of the knock limit ignition timing from a three-dimensional map including the engine rotation speed NE, the engine coolant temperature THW, and the EGR correction volume efficiency KLSMWP as parameters.

Thereafter, in step S104, the electronic control unit 22 calculates the EGR correction advancement amount AEGRMBTS of the MBT ignition timing from a two-dimensional map including a target converging rate REGRPLUS of the exhaust gas recirculation amount and the base correction advancement amount AEGRMBTB of the MBT ignition timing calculated in step S102 as parameters. In step S105, the electronic control unit 22 calculates the EGR correction advancement amount AEGRKNOKS of the knock limit ignition timing from a two-dimensional map including the target converging rate REGRPLUS of the exhaust gas recirculation amount and the base correction advancement amount AEGRKNOKB of the knock limit timing calculated in step S103 as parameters. Then, the electronic control unit 22 terminates the processing of the present routine for this cycle.

Figure 3:
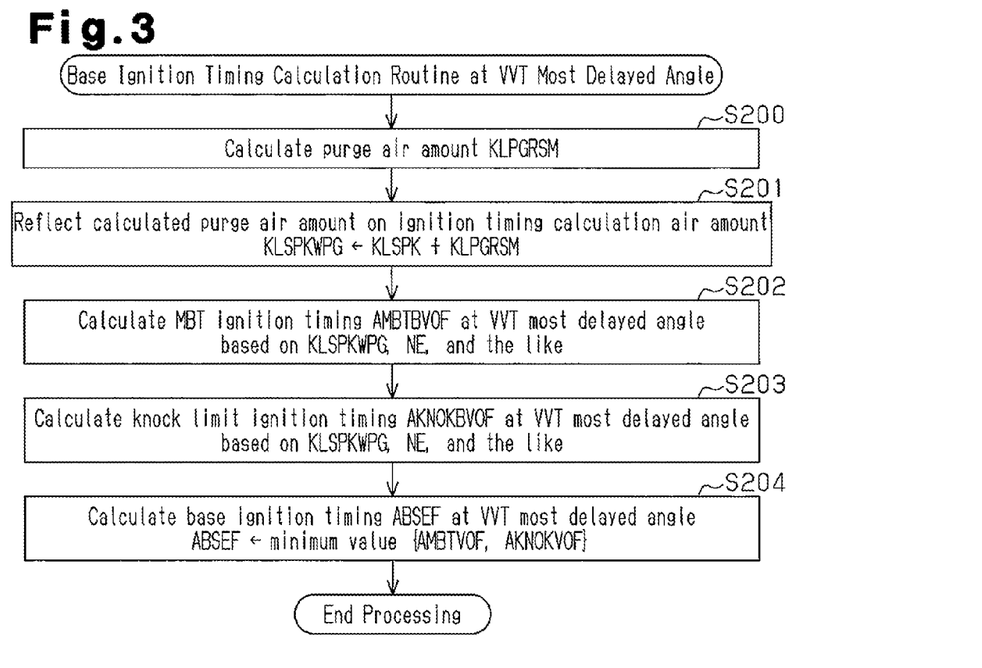
FIG. 3 is a flowchart showing processing procedures of a base ignition timing calculation routine at a VVT most retarded angle employed in the embodiment.

FIG. 3 shows a flowchart of the base ignition timing calculation routine at the VVT most delayed angle. The processing of the present routine is repeatedly executed by the electronic control unit 22 in specified control cycles.

When the present routine starts, the electronic control unit 22 first calculates the purge air amount KLPGRSM in step S200. The purge air amount KLPGRSM in this case is also obtained by calculating a momentary value of the purge air amount from the engine rotation speed NE and the cylinder intake air amount KL obtained from the air model and grading process the calculated momentary value.

In step S201, the electronic control unit 22 reflects the calculated purge air amount KLPGRSM on the ignition timing calculation air amount KLSPKWPG. This reflection is performed by adding the purge air amount KLPGRSM to the base value KLSPK of the ignition timing calculation air amount.

The base value KLSPK of the ignition timing calculation air amount is obtained as an average value of a future predicted value of the cylinder intake air amount obtained from the air model and the graded value of the cylinder intake air amount obtained from the air model.

The electronic control unit 22 calculates the MBT ignition timing AMBTBVOF at the VVT most delayed angle based on the ignition timing calculation air amount KLSPKWPG, the engine rotation speed NE, and the like in step S202. The electronic control unit 22 calculates the knock limit ignition timing AKNOKBVOF at the VVT most delayed angle based on the ignition timing calculation air amount KLSPKWPG, the engine rotation speed NE, and the like in step S203.

The electronic control unit 22 then sets the smallest value of the MBT ignition timing AMBTBVOF and the knock limit ignition timing AKNOKBVOF at the VVT most delayed angle, that is, a further delayed value, as the base ignition timing ABSEF at the VVT most delayed angle in step S204. Then, the electronic control unit 22 terminates the processing of the present routine for this cycle.

Figure 4:
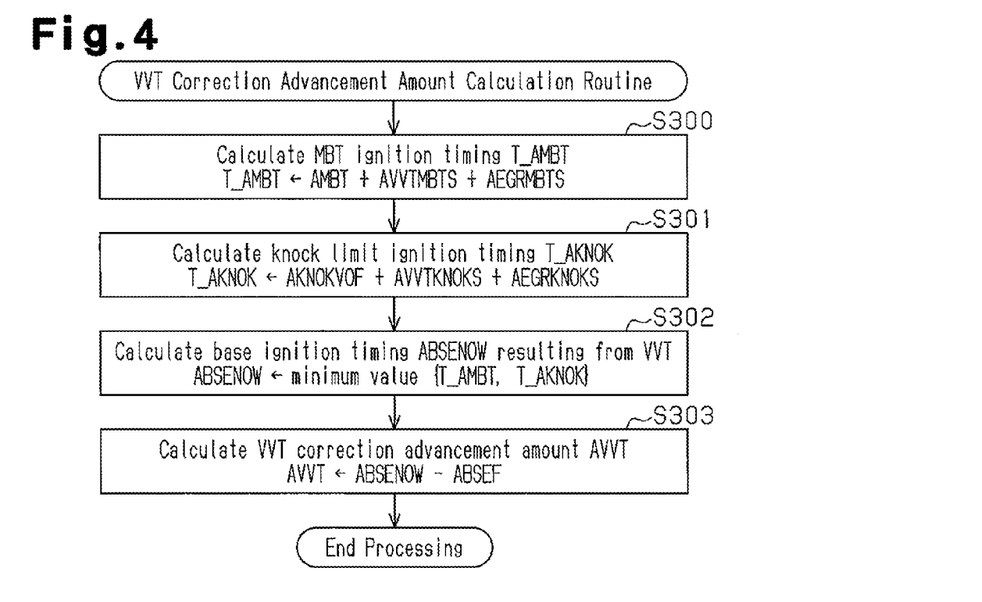
FIG. 4 is a flowchart showing processing procedures of a VVT correction advancement amount calculation routine employed in the embodiment.

After finishing the calculation of the EGR correction advancement amounts AEGRMBTS, AEGRKNOKS of the MBT ignition timing and the knock limit ignition timing, and the base ignition timing ABSEF at the VVT most delayed angle, the electronic control unit 22 calculates the VVT correction advancement amount AVVT based on such values. FIG. 4 shows a flowchart of the VVT correction advancement amount calculation routine related to the calculation of the VVT correction advancement amount AVVT. The processing of the present routine is also repeatedly executed by the electronic control unit 22 in specified control cycles.

When the present routine starts, the electronic control unit 22 first calculates the MBT ignition timing T_AMBT in step S300. The MBT ignition timing T_AMBT is calculated in the following manner. First, a base value AMBT of the MBT ignition timing is obtained from the engine rotation speed NE and the cylinder intake air amount KL obtained from the air model. The obtained base value AMBT is then corrected with the VVT correction advancement amount AVVTMBTS of the MBT ignition timing and the EGR correction advancement amount AEGRMBTS of the previously calculated MBT ignition timing to calculate the MBT ignition timing T_AMBT. The VVT correction advancement amount AVVTMBTS is the correction advancement amount of the MBT ignition timing corresponding to the valve timing of the actual state.

The electronic control unit 22 then calculates the knock limit ignition timing T_AKNOK in step S301. The knock limit ignition timing T_AKNOK is calculated in the following manner. First, a base value AKNOKVOF of the knock limit ignition timing is calculated from the engine rotation speed NE and the cylinder intake air amount KL obtained from the air model. The base value AKNOKVOF is then corrected with the VVT correction advancement amount AVVTKNOKS of the knock limit ignition timing and the EGR correction advancement amount AEGRKNOKS of the previously calculated knock limit ignition timing to obtain the knock limit ignition timing T_AKNOK. The VVT correction advancement amount AVVTKNOKS is the correction advancement amount of the knock limit ignition timing corresponding to the valve timing of the actual state.

In step S302, the electronic control unit 22 sets the minimum value of the MBT ignition timing T_AMBT and the knock limit ignition timing T_AKNOK, that is, a further delayed value, as the base ignition timing ABSENOW at the valve timing of the actual state. In step S303, the electronic control unit 22 sets the value obtained by subtracting the base ignition timing ABSEF at the previously calculated VVT most advanced angle from the base ignition timing ABSENOW as a result of the VVT as the VVT correction advancement amount AVVT of the ignition timing. The electronic control unit 22 then terminates the processing of the present routine for this cycle.

Figure 5:
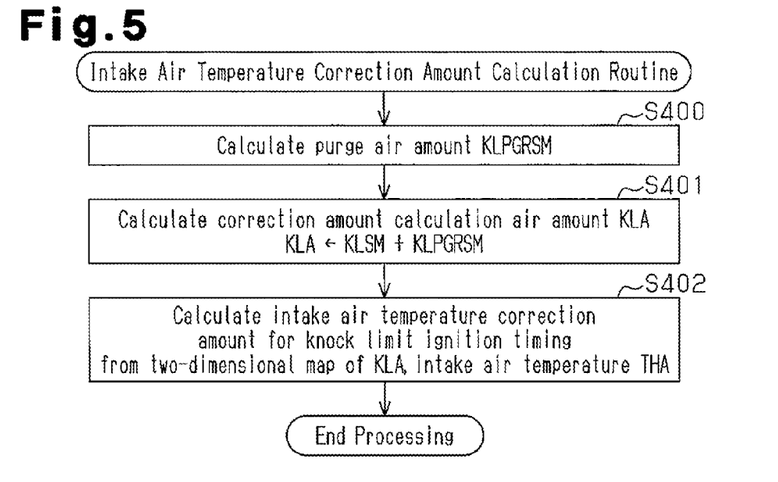
FIG. 5 is a flowchart showing processing procedures of an intake air temperature correction amount calculation routine employed in the embodiment.

In the present embodiment, the electronic control unit 22 corrects the ignition timing in accordance with the intake air temperature during the warming of the engine and the like. The intake air temperature correction amount used for the correction of the ignition timing is calculated based on the two-dimensional map of the cylinder intake air amount and the intake air temperature THA. If the cylinder intake air amount obtained from the air model is directly used for the calculation of the intake air temperature correction amount, the cylinder intake air amount deviates from the actual value when purging is performed in large amounts, and the value of the intake air temperature correction amount may become inappropriate. In the present embodiment, the cylinder intake air amount corrected in accordance with the purge air amount is thus used when calculating the intake air temperature correction amount.

FIG. 5 shows a flowchart of the intake air temperature correction amount calculation routine employed in the present embodiment. The processing of the present routine is repeatedly executed by the electronic control unit 22 in specified control cycles.

When the present routine starts, the electronic control unit 22 calculates a purge air amount KLPGRSM in step S400.

The purge air amount KLPGRSM is also obtained by calculating a momentary value of the purge air amount from the engine rotation speed NE and the cylinder intake air amount KL obtained from the air model, and performing a grading process on the calculated momentary value.

In step S401, the electronic control unit 22 calculates a correction amount calculation air amount KLA. The correction amount calculation air amount KLA is obtained as a value in which the purge air amount KLPGRSM is added to the graded value KLSM of the cylinder intake air amount obtained from the air model.

The electronic control unit 22 then calculates the intake air temperature correction amount for the knock limit ignition timing from the two-dimensional map including the intake air temperature THA and the correction amount calculation air amount KLA calculated in step S401 as parameters, and then terminates the processing of the present routine for this cycle. The calculated intake air temperature correction amount is used to correct the knock limit ignition timing when calculating the knock limit ignition timing during the engine warming.

Figure 6:
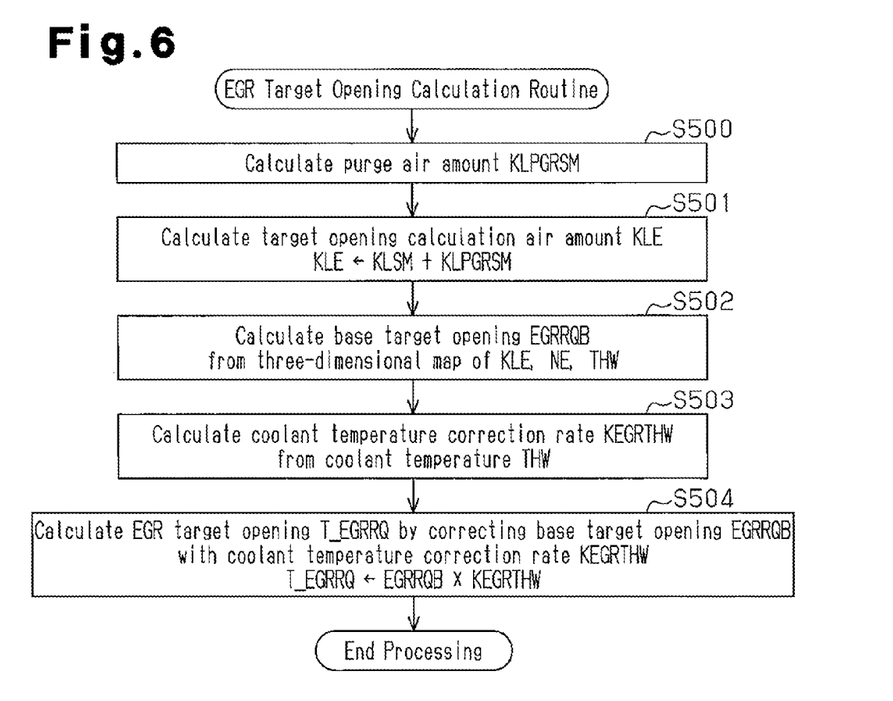
FIG. 6 is a flowchart showing processing procedure of an EGR target opening calculation routine employed in the embodiment.

In the present embodiment, the electronic control unit 22 controls the amount of exhaust gas (exhaust gas recirculation amount) recirculated to the intake air by adjusting the opening of the EGR valve 18. If the large amount of purging is performed in the control of the exhaust gas recirculation amount in this case, the amount of air flowing through the intake passage 1 increases and the intake negative pressure is decreased in correspondence with the amount of purge air. This decreases the amount of exhaust gas recirculated with the intake negative pressure. In the present embodiment, therefore, the cylinder intake air amount corrected with the purge air amount KLPGRSM is used in the calculation of the target opening of the EGR valve 18 to ensure an appropriate amount of recirculating exhaust gas even when purging is performed in large amounts.

FIG. 6 shows a flowchart of an EGR target opening calculation routine employed in the present embodiment. The processing of this routine is repeatedly executed by the electronic control unit 22 in specified control cycles.

When the present routine starts, the electronic control unit 22 first calculates the purge air amount KLPGRSM in step S500. The purge air amount KLPGRSM is also obtained by calculating a momentary value of the purge air amount from the engine rotation speed NE and the cylinder intake air amount KL obtained from the air model, and performing a grading process on the calculated momentary value.

In step S501, the electronic control unit 22 calculates a target opening calculation air amount KLE. The target opening calculation air amount KLE is obtained as a value in which the purge air amount KLPGRSM is added to the graded value KLSM of the cylinder intake air amount obtained from the air model.

In step S502, the electronic control unit 22 calculates a base target opening EGRRQB from a three-dimensional map including the target opening calculation air amount KLE, the engine rotation speed NE, and the engine coolant temperature THW as parameters. In following step S503, the electronic control unit 22 calculates a coolant temperature correction rate KEGRTHW from the engine coolant temperature THW. Thereafter, the electronic control unit 22 corrects the base target opening EGRRQB with the coolant temperature correction rate KEGRTHW to calculate the EGR target opening T_EGRRQ in step S504. Then, the electronic control unit 22 terminates the processing of the present routine for this cycle.

The present embodiment allows for an appropriate setting of the ignition timing and its intake air temperature correction, and the target opening of the EGR valve 18 can be performed regardless of the reduction in the exhaust gas recirculation amount and the reduction in the intake negative pressure involved in the large amount of purging. In the present embodiment, the electronic control unit 22 has a configuration corresponding to a correction unit for correcting at least one of the volume efficiency and the cylinder intake air amount of the internal combustion engine in accordance with the amount of purge air drawn into the intake air.

The present embodiment described above has the following advantages.

(1) In the present embodiment, the volume efficiency (EGR correction volume efficiency KLSMWP) of the internal combustion engine used for the calculation of the advancement correction amount corresponding to the exhaust gas recirculation amount for the MBT ignition timing T_AMBT and the knock limit ignition timing T_AKNOK is corrected in accordance with the purge air amount KLPGRSM. Thus, the appropriate advancement correction of the MBT ignition timing T_AMBT and the knock limit ignition timing T_AKNOK can be performed regardless of a decrease in the exhaust gas recirculation amount when performing purging in large amounts.

(2) In the present embodiment, the cylinder intake air amount (ignition timing calculation amount of air KLSPKWPG) used for the calculation of the MBT ignition timing AMBTBVOF and the knock limit ignition timing AKNOKBVOF at the VVT most delayed angle is corrected in accordance with the purge air amount KLPGRSM. Thus, the MBT ignition timing AMBTBVOF and the knock limit ignition timing AKNOKBVOF at the VVT most delayed angle can be appropriately obtained regardless of the reduction in the exhaust gas recirculation amount when performing purging in large amounts.

(3) In the present embodiment, the cylinder intake air amount (correction amount calculation air amount KLA) used for the calculation of the intake air temperature correction amount, which is used in the correction corresponding to the intake air temperature of the ignition timing, is corrected in accordance with the purge air amount KLPGRSM. Thus, the ignition timing can be appropriately corrected in accordance with the intake air temperature regardless of the reduction in the exhaust gas recirculation amount when purging is performed in large amounts.

(4) In the present embodiment, the cylinder intake air amount (target opening calculation air amount KLE) used for the calculation of the target opening of the EGR valve 18 is corrected in accordance with the purge air amount KLPGRSM. Thus, an appropriate amount of exhaust gas recirculation can be performed regardless of the reduction in the intake negative pressure when performing purging in large amounts.

The present embodiment described above may be modified and implemented as below.

In the embodiment described above, the EGR correction advancement amounts AEGRMBTS, AEGRKNOKS of the MBT ignition timing and the knock limit ignition timing are calculated based on the volume efficiency (EGR correction volume efficiency KLSMWP) of the internal combustion engine corrected by the purge air amount KLPGRSM. The EGR correction advancement amounts AEGRMBTS, AEGRKNOKS may be calculated using the cylinder intake air amount instead of the volume efficiency. In this case, the appropriate advancement correction of the MBT ignition timing T_AMBT and the knock limit ignition timing T_AKNOK may also be performed regardless of the reduction in the exhaust gas recirculation amount when performing purging in large amounts by correcting the cylinder intake air amount, which is used for the calculation, with the purge air amount KLPGRSM.

In the embodiment described above, the EGR correction advancement amounts AEGRMBTS, AEGRKNOKS of the MBT ignition timing and the knock limit ignition timing are calculated based on the volume efficiency of the internal combustion engine corrected by the purge air amount KLPGRSM or the cylinder intake air amount, and the volume efficiency of the internal combustion engine, which is used for such calculation, is corrected with the purge air amount KLPGRSM. The appropriate advancement correction of the MBT ignition timing T_AMBT and the knock limit ignition timing T_AKNOK may also be performed in the following manner. First, the EGR correction advancement amounts AEGRMBTS, AEGRKNOKS are calculated directly using the obtained volume efficiency and the cylinder intake air amount of the air model. The calculated value is then corrected in accordance with the purge air amount KLPGRSM. In this case, the reduction in the exhaust gas recirculation amount when performing purging in large amounts may also be reflected on the values of the EGR correction amount advancement amounts AEGRMBTS, AEGRKNOKS.

In the embodiment described above, the MBT ignition timing AMBTBVOF and the knock limit ignition timing AKNOKBVOF at the VVT most delayed angle are calculated on the basis of the cylinder intake air amount (ignition timing calculation air amount KLSPKWPG) corrected by the purge air amount KLPGRSM. The calculation of such parameters can also be performed using the volume efficiency of the internal combustion engine instead of the cylinder intake air amount. In this case, the MBT ignition timing AMBTBVOF and the knock limit ignition timing AKNOKBVOF at the VVT most delayed angle can be appropriately obtained regardless of the reduction in the exhaust gas recirculation amount when performing purging in large amounts by correcting the volume efficiency of the internal combustion engine, which is used for the calculation, with the purge air amount KLPGRSM.

In the embodiment described above, the MBT ignition timing AMBTBVOF and the knock limit ignition timing AKNOKBVOF at the VVT most delayed angle are calculated based on the cylinder intake air amount or the volume efficiency corrected with the purge air amount KLPGRSM. The reduction in the exhaust gas recirculation amount when performing purging in large amounts may also be reflected on the value of each ignition timing at the VVT most delayed angle by calculating each ignition timing at the VVT most delayed angle directly using the obtained volume efficiency and the cylinder intake air amount of the air model and correcting the calculated values in accordance with the purge air amount KLPGRSM. Thus, in this case, the MBT ignition timing AMBTBVOF and the knock limit ignition timing AKNOKBVOF at the VVT most delayed angle are also appropriately obtained regardless of the reduction in the exhaust gas recirculation amount when performing purging in large amounts.

In the embodiment described above, the intake air temperature correction amount for the ignition timing is calculated based on the cylinder intake air amount (correction amount calculation air amount KLA) corrected with the purge air amount KLPGRSM. Such calculation of the intake air temperature correction amount may also be performed using the volume efficiency of the internal combustion engine instead of the cylinder intake air amount. In this case, the intake air temperature of the ignition timing may be appropriately calculated regardless of the reduction in the exhaust gas recirculation amount when performing purging in large amounts by correcting the volume efficiency of the internal combustion engine, which is used for the calculation, with the purge air amount KLPGRSM.

In the embodiment described above, the intake air temperature correction amount for the ignition timing is calculated based on the cylinder intake air amount or the volume efficiency corrected with the purge air amount KLPGRSM. The reduction in the exhaust gas recirculation amount when performing purging in large amounts may also be reflected on the value of the intake air temperature correction amount by obtaining the intake air temperature correction amount directly using the obtained volume efficiency and the cylinder intake air amount of the air model and correcting the obtained intake air temperature correction amount in accordance with the purge air amount KLPGRSM.

In the embodiment described above, the target opening of the EGR valve 18 is calculated on the basis of the cylinder intake air amount (target opening calculation air amount KLE) corrected by the purge air amount KLPGRSM. Such calculation of the target opening can also be performed using the volume efficiency of the internal combustion engine instead of the cylinder intake air amount. In this case, the appropriate amount of exhaust gas may also be recirculated regardless of the reduction in the intake negative pressure when performing purging in large amounts by correcting the volume efficiency of the internal combustion engine used for the calculation with the purge air amount KLPGRSM.

In the embodiment described above, the target opening of the EGR valve 18 is calculated based on the cylinder intake air amount or the volume efficiency corrected with the purge air amount KLPGRSM. The reduction in the intake negative pressure when performing purging in large amounts can also be reflected on the value of the target opening of the EGR valve 18 by obtaining the target opening directly using the obtained volume efficiency and the cylinder intake air amount of the air model and correcting the obtained target opening in accordance with the purge air amount KLPGRSM. In this case, the appropriate amount of exhaust gas may also be recirculated regardless of the reduction in the intake negative pressure when performing purging in large amounts.

In the embodiment described above, an appropriate exhaust gas recirculation amount is ensured by correcting the target opening of the EGR valve 18 or the volume efficiency of the internal combustion engine and the cylinder intake air amount, which is used for the calculation of the target opening, with the purge air amount KLPGRSM. A control target may be set to the exhaust has recirculating amount, and the EGR valve 18 may be controlled to obtain such control target. In such a case, if purging is performed in large amounts, a non-achievable value may be set as the control target value of the exhaust gas recirculation amount set in accordance with the engine operation state since the expected exhaust gas recirculation amount may not be obtained. With this regards, the control target value of the exhaust gas recirculation amount may be set in view of the reduction caused when purge air flows in by correcting the control target value of the exhaust gas recirculation amount or the volume efficiency of the internal combustion engine and the cylinder intake air amount, which is used for the calculation of the control target value, with the purge air amount KLPGRSM in accordance with the amount of purge air drawn into the intake air.

In the embodiment described above, the target opening of the EGR valve 18 and the control target value of the exhaust gas recirculation amount, or the volume efficiency of the internal combustion engine and the cylinder intake air amount used for the calculation, are corrected in accordance with the purge air amount KLPGRSM. When estimating the exhaust gas recirculation amount or the exhaust gas recirculation rate in accordance with the engine operation state, the estimated result may also deviate from the actual value if reduction in the intake negative pressure occurs when purging is performed in large amounts. In this case, the estimated value, or the volume efficiency of the internal combustion engine and the cylinder intake air amount used for the estimation, may be corrected in accordance with the purge air amount KLPGRSM to appropriately calculate the exhaust gas recirculation amount and the exhaust gas recirculation rate regardless of the reduction in the intake negative pressure when purging is performed in large amounts. The exhaust gas recirculation rate is the ratio of the exhaust gas recirculation amount with respect to the sum of the exhaust gas recirculation amount and the new air intake amount.

In the embodiment described above, the ignition timing, the intake air temperature correction amount of the ignition timing, and the target opening of the EGR valve 18 are calculated based on the volume efficiency or the cylinder intake air amount of the internal combustion engine corrected in accordance with the amount of purging air drawn into the intake air. The engine control parameters other than the above are also subjected to the influence of reduction in the exhaust gas recirculation amount when purging is performed in large amounts if the parameter is correlated with the exhaust gas recirculation amount. Thus, the value can be appropriately set regardless of the reduction in the exhaust gas recirculation amount when purging is performed in large amounts by correcting the volume efficiency or the cylinder intake air amount used for the calculation of the engine control parameter correlated with the exhaust gas recirculation amount in accordance with the purge air amount KLPGRSM. A similar advantage may be obtained by directly correcting such engine control parameter in accordance with the purge air amount KLPGRSM.

In the embodiment described above, the volume efficiency of the internal combustion engine and the cylinder intake air amount are obtained using the air model, but the volume efficiency and the cylinder intake air amount may be calculated with another method. For example, the volume efficiency or the cylinder intake air amount may be obtained from a measurement value of the air flow meter 6.

In the embodiment described above, a case in which the controller of the present invention is applied to an internal combustion engine for a hybrid vehicle has been described. However, the present invention may be applied in the same manner to an internal combustion engine that recirculates large amounts of exhaust gas and performs purging in large amounts.

Description of Reference Characters

1: intake passage
2: combustion chamber
3: exhaust passage
4: air cleaner
5: intake air temperature sensor
6: air flow meter
7: throttle motor
8: throttle valve
9: injector
10: intake air valve
11: variable valve actuation mechanism
12: ignition plug
13: exhaust valve
14: air-fuel ratio sensor
15: catalyst converter
16: EGR passage
17: EGR cooler
18: EGR valve
19: fuel tank
20: canister
21: purge valve
22: electronic control unit
23: crankshaft
24: crank position sensor
25: knock sensor
26: throttle sensor

The invention claimed is:

1. A controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure, the controller comprising:
an electronic control unit that is programmed to:
correct at least one of a volume efficiency or a cylinder intake air amount of the internal combustion engine in accordance with an amount of purge air drawn into the intake air,
use an intake air temperature correction amount to correct an ignition timing of the internal combustion engine in accordance with an intake air temperature, and
calculate the intake air temperature correction amount using the at least one of the volume efficiency or the cylinder intake air amount that has been corrected by the electronic control unit.

2. The controller according to claim 1, wherein the cylinder intake air amount is an amount of air taken into a combustion chamber of the engine.

3. The controller according to claim 2, wherein the volume efficiency and the cylinder intake air amount are obtained from an intake system model, which does not consider influence of the vapor purge.

4. A controller applied to an internal combustion engine including a fuel vapor processing system, which purges and processes collected fuel vapor in intake air at a downstream side of an air flow meter, and an exhaust gas recirculation system, which recirculates some of the exhaust gas to the intake air using intake negative pressure, the controller comprising:
an electronic control unit that is programmed to:
correct at least one of a volume efficiency or a cylinder intake air amount of the internal combustion engine in accordance with an amount of purge air drawn into the intake air, and
calculate a target opening of an ECM valve that adjusts an exhaust gas recirculation amount using the at least one of the volume efficiency or the cylinder intake air amount that has been corrected by the electronic control unit.

5. The controller according to claim 4, where in the cylinder intake air amount is an amount of air taken into a combustion chamber of the engine.

6. The controller according to claim 5, wherein the volume efficiency and the cylinder intake air amount are obtained from an intake system model, which does not consider influence of the vapor purge.

* * * * *